Oct. 18, 1955  M. R. HULL  2,721,052
PINCH-TYPE VALVE
Filed Nov. 4, 1952

INVENTOR.
Monroe R. Hull
BY
ATTORNEYS

United States Patent Office 2,721,052
Patented Oct. 18, 1955

2,721,052

PINCH-TYPE VALVE

Monroe Richmond Hull, Hamilton, Mont.

Application November 4, 1952, Serial No. 318,564

5 Claims. (Cl. 251—6)

This invention relates to an improved pinch-type valve for regulating the flow of fluids through flexible tubes. Essentially this valve mechanism comprises a pair of parallel rollers connected between intermeshing pairs of gear segments at corresponding points displaced from the axes of the segments, so that as the gear segments are revolved about their axes, the rollers are moved through equal arcs together or apart to compress or release the flexible tube positioned therebetween.

Ordinary gate-type and globe-type valves that are satisfactory in liquid and gas pipe lines are not always suitable for controlling the flow of solids or mixtures of liquids and solids, since such valves are easily clogged and are liable to be subject to excessive wear under such conditions. It is therefore accepted practice to use pinch-type valves in conjunction with a section of flexible pipe line, such as a tube or hose of synthetic or natural rubber, to regulate the flow of these materials through pipe lines in chemical and metallurgical plants. Such pinch-type valves are also employed to control the flow of corrosive or abrasive liquids. Generally, pinch valves have a pair of parallel closing jaws actuated by one or more screw-stems and hand wheels. However, valves of this design cannot be opened or closed rapidly, and maintenance of such valves to keep them in good operating condition is sometimes expensive.

The improved valve provided by this invention not only can be operated easily and rapidly, for it can be operated by a single lever located in the position most convenient for the operator, but is also simple in construction. The mechanism requires little or no maintenance over a long period of time. Furthermore, since this improved valve compresses the walls of the flexible tube towards the axis of the tube equally from both sides, it will cause a minimum amount of distortion of the flexible tube in partly or completely closing it. Thus the service life of the tube is prolonged in comparison with the service life of sections of flexible tube repeatedly closed and opened by the usual type of pinch valve, which compresses the wall of the tube against an anvil in one direction only and causes much greater distortion of the wall.

The valve mechanism of this invention comprises a pair of driving gear segments which are mounted in a frame, so as to rotate about a common axis, and which are in parallel planar relationship to each other, one on either side of a flexible tube in corresponding positions. A pair of driven gear segments is mounted in like manner opposite to the driving segments and in intermeshing relationship therewith. Gear-rotating means are provided, such as a lever handle attached along a radius of at least one of the driving gear segments with its fulcrum at the axis of the segment, in order to rotate all four gear segments at the same time about their axes. A roller is connected between each of the two pairs of gear segments, each roller being eccentrically disposed between its respective pair of segments, with its ends attached to corresponding points on each of the segments adjacent to the periphery of the segment. The axes of the pair of eccentrically mounted rollers are parallel to each other and the rollers are at all times spaced equidistant from the axis of the flexible tube which is positioned between them.

When the handle means is actuated to rotate the driving gear segments about their axes, the driven gear segments are also rotated since they are intermeshed with the driving gears. The pair of parallel rollers, which are preferably attached between the pairs of gears perpendicularly to the parallel planes in which the gears lie as well as perpendicularly to the axis of the flexible tube positioned between the rollers, are caused to move together or apart by the rotation of the gear segments since they are attached at their ends to points displaced from the axes of the segments. In this way, as the rollers are moved together they compress the walls of the flexible tube to an equal extent on opposite sides of the tube, thus reducing or completely closing the passage through the tube. By rotating the gear segments in the opposite direction, the rollers may be moved apart and the flexible tube opened.

Advantageously, all four of the gear segments employed have equal radii and are gear quadrants, i. e. are in the form of that portion of a circle bounded by an arc of 90°. However, other forms of gear segments, and also complete gears, may be employed in the mechanism.

An advantageous embodiment of this invention is described below with reference to the accompanying drawings, in which.

Figure 2:
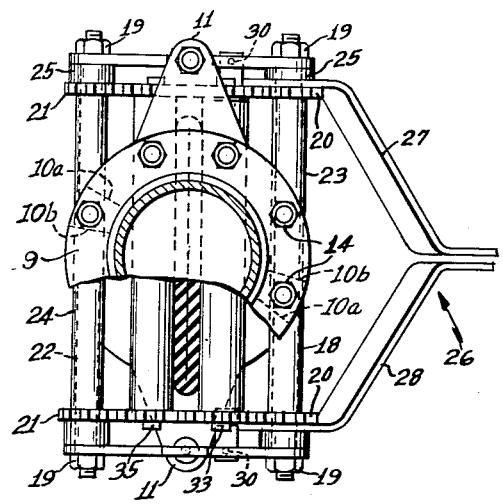
Fig. 2 is a plan of the valve of Fig. 1 in partial section.

In the drawings the valve mechanism is shown installed between two portions of a pipe line 6. The two portions of the pipe line are joined by a cylindrical section of flexible tube 7, usually formed of natural or synthetic rubber and having an integral flange 8 at each of its two ends. The walls of the flexible tube 7 may be reinforced by fiber cords or fabric embedded therein. The integral flanges 8 at both ends of the tube 7 are clamped between pipe line flanges 9, secured to the pipe line portions 6, and split flanges 10. The split flanges 10 may be separated into two substantially semi-circular pieces along the lines 10a, 10b (Fig. 2), each of these pieces being arranged to overlap with the other so that they can be held together by bolts extending through the overlapping portions. There is a set of these clamping flanges, 9 and 10, at either end of tube 7. The split flanges 10 each have extension arms 11 on opposite sides to receive bolts 12 with lock nuts 13. The flanges are drawn together in sealing contact by a plurality of bolts 14 which extend therethrough.

Figure 1:
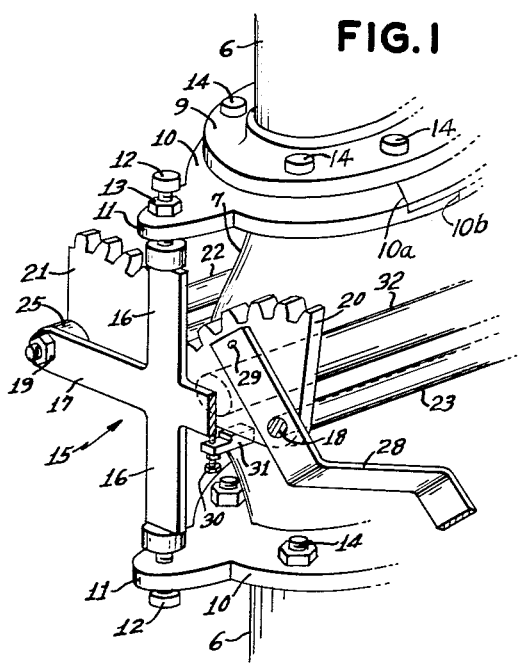
Fig. 1 is a perspective showing the operating mechanism of a valve constructed according to this invention.

As is clearly shown in Fig. 1, the frame on which the moving parts of the valve are mounted is attached between the extension arms 11 of each of the two split flanges 10. This frame consists of a pair of cross-frame members 15 whose supporting arms 16 extend parallel to the longitudinal axis of the pipe line 6 and are secured to the split flange extension arms 11 by bolts 12 and lock nuts 13. Gear shaft arms 17 extend at right angles to the supporting arms 16 and carry a pair of gear shafts 18 and 22, the gear shafts being secured to the frame by nuts 19. This supporting frame arrangement, with a cross-frame member 15 attached between split flange extensions 11, is duplicated on the opposite side of the flexible tube 7 as can clearly be seen from the plan view of Fig. 2. The gear shafts 18 and 22 are parallel to each other and extend between the two gear shaft arms 17 of the two cross-frame members 15 positioned on either side of the flexible tube.

A pair of driving gear quadrants 20 is mounted adjacent opposite ends of the gear shaft 18, and a pair of driven gear quadrants 21 is mounted adjacent to the ends of the gear shaft 22 in intermeshing relation with the driving gear quadrants. A tubular spacer 23 maintains the driving gear quadrants 20 in properly spaced relation, and a similar tubular spacer 24 maintains the driven gear quadrants 21 similarly spaced apart. Spacer collars 25 are positioned between each of the four gear quadrants, comprising the driving and driven pairs of gears 20 and 21, and the support arms 17, to space the gear quadrants from the supporting frame members and permit lubrication.

An actuating lever 26 has two arms 27 and 28 which are secured to the pair of driving gear quadrants 20. The arms 27 and 28 of the lever bend together to form a valve actuating handle. The intermeshed pairs of gear quadrants can be rapidly rotated by this lever, whose fulcrum is at the ends of gear shaft 18 and which is attached to each of the pair of driving gear quadrants 21 at a second point by pins 29.

Figure 4:
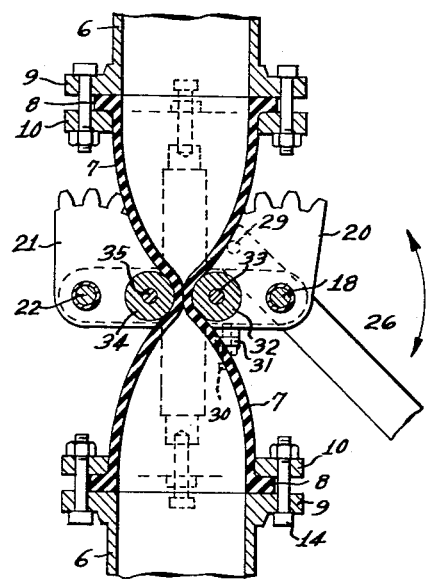
Fig. 4 is a sectional elevation of the valve of Fig. 1 in a closed position.

An adjustable stop screw 30 is mounted in a bracket 31 which extends out from and at right angles to each of the two driving gear quadrants 20. The brackets 31 are welded or otherwise securely attached to these quadrants. The screws 30 are each held in line with the edge of the gear support arm 17 by the brackets 31. When the lever 26 is actuated so as to rotate the gear quadrants to the position shown in Figs. 1 and 4, the ends of the two screws 30 contact the edges of the two arms 17 on either side of the pipe line and prevent further rotation of the gear quadrants.

A first tubular closing roller 32 is mounted between the pair of driving gear quadrants 20 with its axis at right angles to the parallel planes in which the gear quadrants rotate and perpendicular to the axis of the flexible hose 7. This roller 32 is supported by and rotates about a shaft 33 which is eccentrically attached at each of its ends to the pair of driving gear quadrants 21. These points of attachment are in corresponding positions on the gear quadrants, displaced from the axis of the quadrants and, preferably, are adjacent to the periphery of each quadrant in corresponding corners thereof. Thus, as the pair of driving quadrants 20 are rotated about their shaft 18 by the actuating lever 26, the closing roller 32 will be moved either towards or away from the section of flexible hose 7, depending on the direction of rotation.

A second closing roller 34, similar to the first closing roller 32, is mounted between the pair of driven gear quadrants 21 and revolves about a supporting shaft 35. This second roller 34 is eccentrically mounted between the driven quadrants 21 in the same manner as the first roller 32 is mounted between the driving quadrants 20. The axes of first and second rollers 32 and 34 are equidistant respectively from the axes of gear shafts 18 and 22, and in all operating positions they are substantially equidistant from the axis of flexible hose 7.

The supporting shafts 33 and 35 for the closing rollers 32 and 34 are secured in place by set screws extending through tapped holes 36 in the gear quadrants. The shafts are so located that when the rollers 32 and 34 are brought as close together as possible by the rotation of the gear quadrants, a space that is only slightly less than twice the thickness of the wall of flexible tube 7 will remain between the surfaces of the rollers. Thus, when the valve is in the closed position with the rollers 32 and 34 as close to one another as they can be brought by the mechanism, the flexible tube will be squeezed together and firmly and completely closed, but will not be pinched so as to cut or otherwise damage the material of which it is made.

Figure 3:
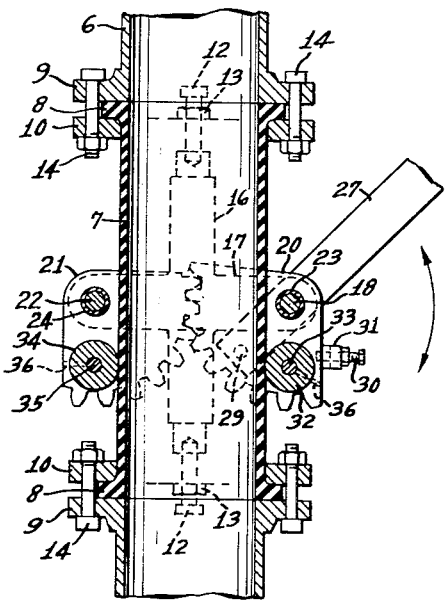
Fig. 3 is a sectional elevation of the valve of Fig. 1 in an open position.

The operation of this valve mechanism is quite simple. The valve is shown in an open position in Fig. 3, and in a closed position in Fig. 4. When it is desired to close the valve partially or completely from the position shown in Fig. 3, the handle portion of the actuating lever 26 is grasped and the lever is turned about its fulcrum, which is the gear shaft 18. This causes the pair of driving gear quadrants 20 to rotate about the gear shaft 18. Since the driving gear quadrants 20 and the driven gear quadrants 21 are intermeshed, the pair of driven gear quadrants 21 also rotate to an equal degree. The first and second closing rollers 32 and 34, which are mounted off-center between the pairs of driving and driven quadrants respectively, are moved together equal distances in circular arcs about the axes of gear shafts 18 and 22. As clearly shown in Fig. 4, the closing rollers compress the walls of the flexible tube 7 together an equal amount from opposite sides until the hose is completely closed. Although not shown in the present embodiment of the invention, a ratchet or similar locking device may be mounted so as to hold the valve mechanism in any desired position of partial closure. When the valve has been completely closed, the adjustable stop screws 30 bear against the edges of the gear shaft support arms 17 to prevent further rotation of the gear quadrants. By positioning the stop screws to permit rotation of the gear quadrants just a trifle beyond the position in which the axes of the gear shafts 18 and 22 and the axes of the roller shafts 33 and 35 are all in the same plane, the valve will be held closed by a toggle effect until it is released by manipulation of the lever 26.

This pinch-type valve has proven extremely satisfactory in operation. It may be installed in either vertical or horizontal pipe lines, or at any desired degree of inclination.

I claim:

1. A valve to regulate the flow of fluid through a flexible tube comprising a pair of driving gear segments rotatably mounted on a common axis and spaced apart in parallel planar relationship one on either side of the tube in corresponding positions, a pair of driven gear segments mounted in like manner opposite to said driving segments and in intermeshing relationship therewith, all four of said gear segments having equal radii, a lever rigidly attached along a radius of at least one of said driving gear segments with its fulcrum at the axis of the segment, a first roller disposed eccentrically between said pair of driving segments with its axis perpendicular to the planes of rotation of said segments and with its ends attached to corresponding points on the driving gear segments, a second roller similarly disposed between and attached to the gear segments comprising the driven pair, said rollers being rotatable about their axes which are parallel to each other and perpendicular to the axis of the flexible tube, said rollers being spaced equidistant from the axis of the flexible tube which is positioned therebetween, whereby said flexible tube is equally compressed on opposite sides by said rollers as they are moved together by said lever revolving the gear segments and is released as said rollers are moved apart, and rigid stop means for said pair of driving gear segments being provided to stop rotation thereof after the axes of said rollers have moved together through and slightly beyond the plane defined by the axes of said driving and driven gear segments, whereby said valve is held closed by compressed portions of said flexible tube urging said pair of rollers apart after compression of the flexible tube.

2. A valve to regulate the flow of fluid through a flexible tube comprising a pair of driving gear segments rotatably mounted on a common axis and spaced apart in parallel planar relationship one on either side of the tube in corresponding positions, a pair of driven gear segments mounted in like manner opposite to said driving segments and in intermeshing relationship therewith, handle means attached to said pair of driving gear segments to rotate them about their axis, a first roller disposed eccentrically between said pair of driving segments with its axis perpendicular to the planes of rotation of said segments and with its ends attached to corresponding points on the driving gear segments, a second roller similarly disposed between and attached to said pair of driven segments, said rollers being rotatable about their axes which are parallel to each other and perpendicular to the axis of the flexible tube, said rollers being spaced equidistant from the axis of the flexible tube, and said tube being positioned between said rollers, whereby said rollers may be moved together to compress said flexible tube and apart to release said flexible tube by operation of said handle means, and rigid stop means for said pair of driving gear segments being provided to stop rotation thereof after the axes of said rollers have moved together through and slightly beyond the plane defined by the axes of said driving and driven gear segments, whereby said valve is held closed by compressed portions of said flexible tube urging said pair of rollers apart after compression of the flexible tube.

3. A valve to regulate the flow of fluid through a flexible tube comprising a pair of driving gear quadrants rotatably mounted on a common axis and spaced apart in parallel planar relationship one on either side of the tube in corresponding positions, a pair of driven gear quadrants mounted in like manner opposite to said driving quadrants and in intermeshing relationship therewith, handle means attached to said pair of driving gear quadrants to rotate them about their axis, a first roller disposed between said pair of driving gear quadrants with its ends attached to corresponding points on the quadrants adjacent to their peripheries, a second roller disposed in like manner between the pair of driven gear quadrants, said rollers having their axes parallel to each other, said rollers being freely rotatable about their axes and being at all times spaced equidistant from the axis of the flexible tube, and said tube being positioned between said rollers, whereby said rollers may be moved together to compress said flexible tube and apart to release said flexible tube when said gear quadrants are rotated by operation of said handle means, and rigid stop means for at least one of said pairs of gear quadrants to stop rotation thereof after the axes of said rollers have moved together through and slightly beyond the plane defined by the axes of said gear quadrants, whereby said valve is held closed by compressed portions of said flexible tube urging said rollers apart.

4. A valve to regulate the flow of fluid through a flexible tube comprising two pairs of intermeshing gear segments rotatably mounted adjacent to said tube, a pair of rollers each disposed eccentrically between and having its ends attached to corresponding points on the gear segments of one of said pairs of gear segments, said flexible tube being positioned between said rollers, said rollers being movable together and apart by the rotation of said gear segments, the axes of said rollers being parallel to each other and at all times spaced equidistant from the axis of the flexible tube, and said rollers being freely rotatable about their axes, and rigid stop means to limit the rotation of said gear segments after the axes of said rollers have moved together through and slightly beyond the plane of the axes of said gear segments in compressing the flexible tube, whereby said valve is held closed by compressed portions of said flexible tube urging said pair of rollers apart.

5. A valve to regulate the flow of fluid through a pipe having a flexible tube installed between spaced portions of the pipe comprising a frame mounted on at least one of the spaced portions of said pipe, gear means rotatably mounted on said frame in intermeshing relationship with each other on opposite sides of the flexible tube, a pair of rollers each eccentrically mounted on said gear means and having said tube positioned therebetween, said rollers having their axes parallel to each other and being at all times spaced equidistant from the axis of the tube, handle means to rotate said gears and thereby to move said rollers together to compress the flexible tube and apart to release the flexible tube, rigid stop means on one of said gear means for engaging said frame after the axes of said rollers have moved together through and slightly beyond the plane of the axes of said gear means in compressing the flexible tube, whereby said valve is held closed by compressed portions of said flexible tube urging said pair of rollers apart and, in turn, urging the stop means into engagement with said frame.

References Cited in the file of this patent

UNITED STATES PATENTS

| 177,478 | Curtiss | May 16, 1876 |
| 836,638 | Price | Dec. 25, 1906 |
| 1,183,907 | Roesel | May 23, 1916 |
| 1,809,091 | Wiken | June 9, 1931 |
| 2,681,751 | Stone | June 22, 1954 |

FOREIGN PATENTS

| 254,906 | Switzerland | 1948 |
| 646,167 | Great Britain | 1950 |